(No Model.)

J. KAMES.
CONDUIT FOR ELECTRIC CONDUCTORS.

No. 393,013. Patented Nov. 20, 1888.

Witnesses,
Robert Everett,
J. A. Rutherford.

Inventor,
Joshua Kames.
By James L. Norris,
Atty.

UNITED STATES PATENT OFFICE.

JOSHUA KAMES, OF PHILADELPHIA, PENNSYLVANIA, ASSIGNOR, BY MESNE ASSIGNMENTS, TO THE NATIONAL ELECTRIC CONDUIT COMPANY, OF CAMDEN, NEW JERSEY.

CONDUIT FOR ELECTRIC CONDUCTORS.

SPECIFICATION forming part of Letters Patent No. 393,013, dated November 20, 1888.

Application filed January 12, 1888. Serial No. 260,572. (No model.)

*To all whom it may concern:*

Be it known that I, JOSHUA KAMES, a citizen of the United States, residing at Philadelphia, in the county of Philadelphia and State of Pennsylvania, have invented new and useful Improvements in Subways or Conduits for Electric Conductors, of which the following is a specification.

This invention relates to conduits for the purpose of transmitting electrical energy to a motor by which a public conveyance is propelled, or for supplying electricity at points distant from the source of generation, for lighting or heating or for furnishing power to stationary motors, and for other purposes unnecessary to enumerate; and to this end my invention consists in a conduit and conductor constructed and arranged in the manner hereinafter fully described, and specifically pointed out in the claims, due reference being had to the accompanying drawings, forming part of this specification, wherein—

Figure 1:
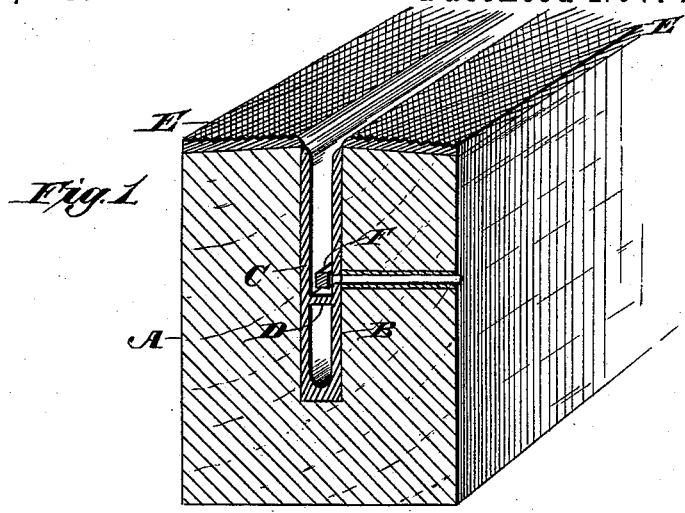
Figure 2:
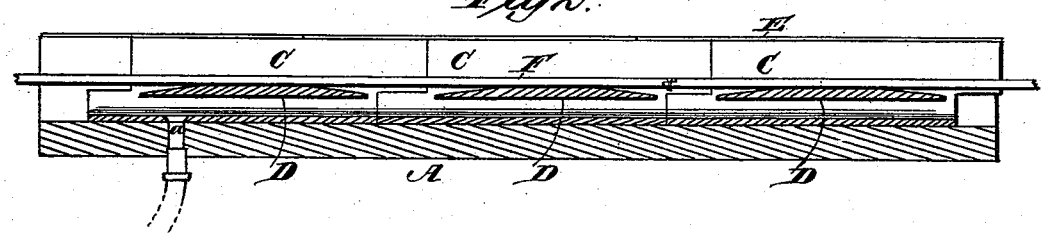

Figure 1 is a vertical cross-section of the conduit and conductor; Fig. 2, a vertical longitudinal section; and Figs. 3 and 4, detail views of sections of insulating-linings employed in connection with the conduit.

Referring to the drawings, the letter A indicates a timber, preferably rectangular in cross-section, said timber being grooved, as at B, throughout its entire length. The groove B is provided with an insulating-lining, C, preferably composed of glass, said lining covering the bottom and side walls of the groove and extending up flush with the top surface of the timber, at which point it is slightly rounded. At a convenient point above the bottom of the groove B is a support, D, consisting of a glass plate slightly higher at its center than at its ends, and extending about two-thirds of the length of each section of timber. This glass plate D, I contemplate casting or molding in one piece with the lining C. Upon top of the timber A and upon each side of the groove B are secured metal plates or shoes E, to prevent wear of the timber, and the surface of these shoes is corrugated, grooved, or "spudded," in order to roughen the same and prevent injury to horses and pedestrians.

A certain number of the sections of the conduit are provided with openings a, communicating with the bottom of the groove B, made by boring through the timber and lining, and are intended to be connected to a sewer or other source of drainage, for the purpose of allowing all water to pass off from the conduit to the sewer or drain.

F indicates an electrical conductor, consisting of a copper rod or wire square or rectangular in cross-section, and said conductor lies within the insulated groove B and rests upon the supporting-plates D. This conductor is made in sections of suitable length, said sections being joined together, so that in the event of the breakage of the conductor or the conduit at any point a portion of the conductor or conduit or both can be removed without disturbing the remainder of the line.

Figure 3:
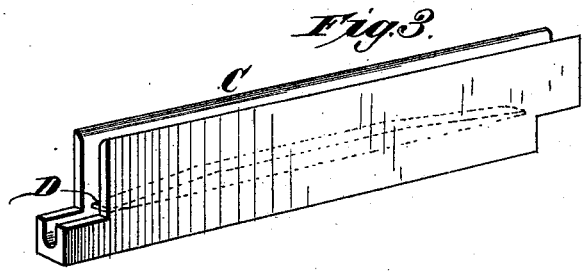
Figure 4:
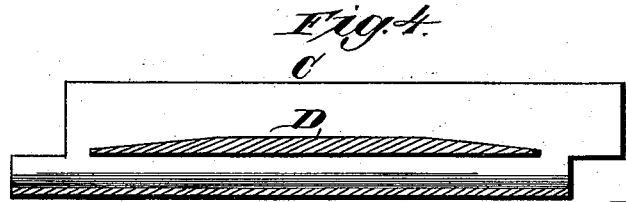

As shown in Figs. 2, 3, and 4, the ends of the sections of the conduit are joined together by lap or break joints, so that when laid the conduit will be practically continuous.

When used as a means for furnishing electrical energy to a motor by which a conveyance is propelled, a connector carried by the motor will be lowered into the groove B and lie in contact with and travel on the conductor F, and the conductor substantially occupying the entire width of the insulated groove, no chance is afforded the connector carried by the motor for slipping off of and out of contact with the conductor. Should the conductor become unevenly worn upon one of its plane sides, it may be turned over so as to present a new and unworn surface, and the conductor being square in cross-section, it will be seen that four surfaces may be from time to time presented for contact with the connector.

If it is desired to connect the conductor with a building or buildings, suitable perforations will be bored through the timbers and the glass lining and a glass or other non-conducting tube inserted therein, through which wires may be passed to connect with the conductor.

It will be understood that in practice the grooved and insulated sections of timber will be buried in the roadway in such manner that the iron shoes E will be flush with the surface of the roadway, and preparatory to laying the sections I prefer to treat the timbers composing said sections with a bath of coal-tar or other preservative substance for the purpose of preventing decay of the same.

While I have described the conductor as being rectangular in cross-section, I do not wish to be understood as confining myself to such shape, as the said conductor may be of any suitable form in cross-section.

What I claim is—

1. In an electric subway, the combination of the longitudinally-grooved timber A, the insulating-lining C, covering the bottom and side walls of the groove and provided with a series of laterally-projecting separated supporting-plates, D, of insulating material, arranged on the lining above the bottom of the groove, and a conductor, F, bearing at intervals on the upper surfaces of the insulating-plates, substantially as described.

2. In an electrical subway, the timbers A, grooved longitudinally, said grooves being lined with an insulating material formed in sections and provided with supporting-plates D, each plate having a raised central portion, in combination with an electrical conductor resting at intervals upon said supporting-plates, substantially as described.

3. In an electrical subway, the combination, with the grooved timbers A, of the sectional glass lining C, having supporting-plates D cast integral therewith, each plate having a raised portion between its ends, and an electrical conductor resting upon said supporting-plates, substantially as described.

In testimony whereof I have affixed my signature in presence of two witnesses.

JOSHUA KAMES.

Witnesses:
 JOS. L. COOMBS,
 JAMES A. RUTHERFORD.